United States Patent
Ito et al.

(10) Patent No.: US 6,608,465 B2
(45) Date of Patent: Aug. 19, 2003

(54) POSITIVE ELECTRODE FOR ALKALINE STORAGE BATTERY AND ALKALINE STORAGE BATTERY USING THE SAME

(75) Inventors: Kojiro Ito, Kosai (JP); Kiyoshi Hayashi, Toyohashi (JP); Toshihiro Yamada, Toyohashi (JP); Nobuyasu Morishita, Toyohashi (JP); Shinichi Yuasa, Kyotanabe (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/284,653

(22) Filed: Oct. 30, 2002

(65) Prior Publication Data

US 2003/0108791 A1 Jun. 12, 2003

(30) Foreign Application Priority Data

Oct. 31, 2001 (JP) .......................... 2001-334185

(51) Int. Cl.$^7$ ............................... H02J 7/00; H01M 4/52
(52) U.S. Cl. ....................... 320/107; 429/223
(58) Field of Search ................. 320/107; 429/223, 429/206, 232, 49, 52, 10

(56) References Cited

U.S. PATENT DOCUMENTS

| | | | |
|---|---|---|---|
| 5,840,442 A | * | 11/1998 | Abe ........................... 429/206 |
| 6,083,642 A | | 7/2000 | Kato et al. ................ 429/218.1 |
| 6,368,748 B1 | * | 4/2002 | Takee et al. ................. 429/223 |

FOREIGN PATENT DOCUMENTS

| | | |
|---|---|---|
| JP | 61-49374 | 3/1986 |
| JP | 3-78965 | 4/1991 |
| JP | 7-320735 | 12/1995 |
| JP | 11-97008 | 4/1999 |
| JP | 2000-340221 | 12/2000 |

* cited by examiner

*Primary Examiner*—Edward H. Tso
*Assistant Examiner*—Pia Tibbits
(74) *Attorney, Agent, or Firm*—Merchant & Gould P.C.

(57) ABSTRACT

A positive electrode for an alkaline storage battery having a high capacity and facilitating the manufacturing thereof and an alkaline storage battery using the same are provided. The positive electrode utilized includes active material powder containing nickel hydroxide and powder made of cobalt compounds, where a ratio of a cobalt compound with a valence of cobalt being 2.6 or more to the whole of cobalt compounds is 30 weight % or more.

6 Claims, 4 Drawing Sheets

POSITIVE ELECTRODE FOR ALKALINE STORAGE BATTERY AND ALKALINE STORAGE BATTERY USING THE SAME

BACKGROUND OF THE INVENTION

1. Field of the Invention

The present invention relates to positive electrodes for alkaline storage batteries and alkaline storage batteries using the same.

2. Related Background Art

Recently, in the field of portable information equipment such as cellular phones and lap top personal computers, there has been a strong demand for secondary batteries having a high energy density. Hence, in order to realize secondary batteries with a high capacity, a positive electrode formed by filling a porous conductive support with nickel hydroxide has been developed and is used widely. However, the simply filling of the support with nickel hydroxide cannot provide batteries with a sufficient high capacity because of a poor utilization factor of the active material. Thus, in order to increase the utilization factor of an active material, a positive electrode with divalent cobalt hydroxide powder added to nickel hydroxide powder (JP 61(1986)-49374 A) and a positive electrode with nickel hydroxide particles whose surface is coated with a cobalt hydroxide layer and a β-CoOOH layer (JP 3(1991)-78965 A) have been proposed. Additionally, a positive electrode having nickel hydroxide particles coated with a cobalt compound, to which a cobalt compound further is added, also has been proposed (JP 2000-340221 A). All of these methods utilize a cobalt compound functioning as a conductant agent so as to improve the utilization factor of the active material.

According to the conventional method of adding cobalt hydroxide powder, however, a large amount of cobalt hydroxide powder has to be added in order to improve the utilization factor of the active material sufficiently. As a result, the amount of the active material (nickel hydroxide) contained in the electrode plate is decreased, which decreases the capacity of the electrode plate. In addition, as a result of the present inventors' investigation, the coating on the surface of the nickel hydroxide particles with the cobalt hydroxide layer and the β-CoOOH layer could not enhance the utilization factor of the active material sufficiently. Furthermore, the process of forming a coating layer of the cobalt compound on the surface of the active material is excessively complicated compared with the process of simply adding the cobalt compound, and therefore is inappropriate for mass production.

SUMMARY OF THE INVENTION

Therefore, with the foregoing in mind, it is an object of the present invention to provide a positive electrode for an alkaline storage battery having a high capacity and facilitating the manufacturing thereof and an alkaline storage battery using the same.

The present inventors have found that in a positive electrode using an active material powder containing nickel hydroxide as a main component and powder made of cobalt compounds, the positive electrode with a significantly high utilization factor of the active material can be obtained by setting a ratio of a cobalt compound with a valence of cobalt being 2.6 or more to the total cobalt compounds at 30 weight % or more. The present invention is based on this findings.

A positive electrode for an alkaline storage battery according to the present invention includes first powder containing nickel hydroxide and second powder made of cobalt compounds. In this positive electrode, a ratio of a cobalt compound with a valence of cobalt being 2.6 or more to the total cobalt compounds is 30 weight % or more. Since this positive electrode eliminates the need for coating the first powder (i.e., active material powder) with a cobalt compound, the positive electrode can be produced easily. In addition, by setting the ratio of the cobalt compound with a valence of cobalt being 2.6 or more to the total cobalt compounds at 30 weight % or more, the utilization factor of the active material can be enhanced.

In the aforementioned positive electrode of the present invention, a weight ratio between the first powder and the second powder may be as follows: the first powder: the second powder=100:X, where $2 \leq X \leq 25$. With this configuration, a positive electrode capable of making up a high-reliability battery can be obtained.

In the aforementioned positive electrode of the present invention, the cobalt compound with a valence of cobalt being 2.6 or more may be β cobalt oxyhydroxide.

In the aforementioned positive electrode of the present invention, the first powder may include nickel hydroxide containing at least one element selected from cobalt, zinc, cadmium, magnesium, yttrium, ytterbium and erbium in a solid solution state. With this configuration, a positive electrode capable of making up a battery with excellent properties can be obtained.

In the aforementioned positive electrode of the present invention, the cobalt compounds may contain at least one element selected from cobalt, zinc, cadmium, magnesium, yttrium, ytterbium and erbium in a solid solution state. With this configuration, a positive electrode capable of making up a battery with excellent properties can be obtained.

An alkaline storage battery according to the present invention includes a positive electrode, a negative electrode, a separator and an electrolyte, where the positive electrode is the aforementioned positive electrode for an alkaline storage battery according to the present invention.

DETAILED DESCRIPTION OF THE INVENTION

Figure 1:
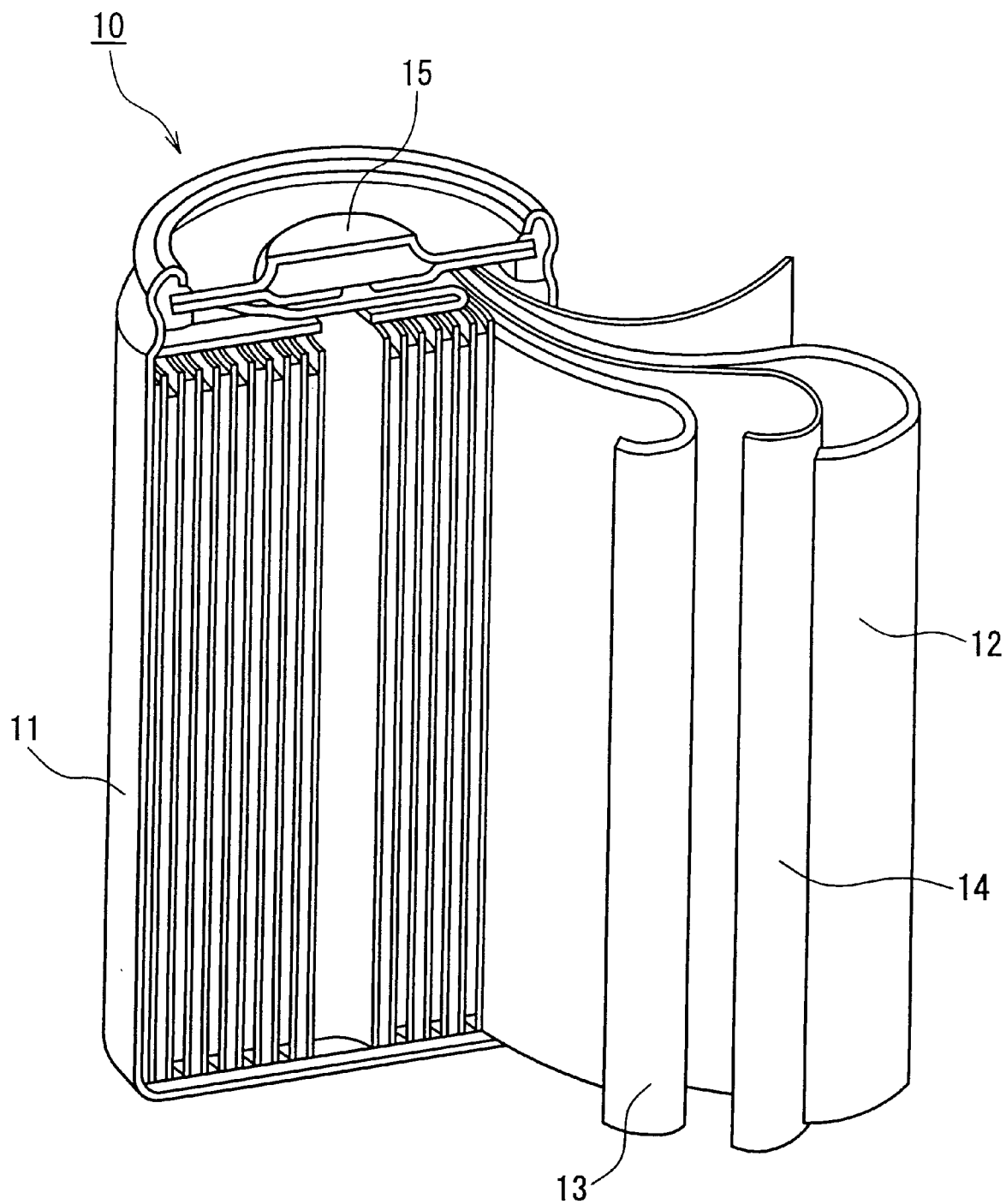
FIG. 1 is a partially exposed perspective view schematically showing an example of an alkaline storage battery of the present invention.

The following describes embodiments of the present invention.

Embodiment 1

Embodiment 1 describes a positive electrode for an alkaline storage battery according to the present invention (hereinafter also simply referred to as positive electrode). The positive electrode in Embodiment 1 includes a conductive porous support and a mixture that is filled in the support. As the support, a nickel foam can be used, for example.

The mixture includes active material powder (hereinafter also referred to as first powder) and powder made of cobalt compounds (hereinafter also referred to as second powder). The second powder consists of cobalt compounds. It is preferable that the mixture contains the first powder and the second powder in a weight ratio of 100:X, where $2 \leqq X \leqq 2.5$. The mixture further may contain cobalt metal.

The active material powder substantially consists of nickel hydroxide or is a solid solution that contains nickel hydroxide as a principal component. As the solid solution of nickel hydroxide, nickel hydroxide containing at least one element selected from cobalt, zinc, cadmium, magnesium, yttrium, ytterbium and erbium in a solid solution state can be used, for example. On the surface of this active material powder, a coating layer made of a cobalt compound is not formed.

In the positive electrode according to Embodiment 1, a cobalt compound with a valence of cobalt being 2.6 or more makes up 30 weight % or more (preferably 30 weight % to 70 weight %) of the total cobalt compounds contained in the mixture. A cobalt compound with a valence of cobalt being less than 2.6 makes up less than 70 weight % of the total cobalt compounds contained in the mixture. As the cobalt compound with a valence of cobalt being 2.6 or more, at least one compound selected from cobalt oxyhydroxide (CoOOH) and tricobalt tetroxide ($Co_3O_4$) can be used, and the use of β cobalt oxyhydroxide (β-CoOOH) is preferable especially. As the cobalt compound with a valence of cobalt being less than 2.6, at least one selected from cobalt hydroxide ($Co(OH)_2$), cobalt monoxide (CoO) and cobalt sulfate ($CoSO_4$) can be used. The aforementioned cobalt compounds may contain at least one element selected from cobalt, zinc, cadmium, magnesium, yttrium, ytterbium and erbium in a solid solution state.

The above-stated β cobalt oxyhydroxide is a crystal that belongs to a hexagonal system, and an interplanar spacing of a plane (003) thereof is in a range of 0.35 nm to 0.53 nm. β cobalt oxyhydroxide is obtained by subjecting cobalt hydroxide powder to a heat treatment in an atmosphere containing oxygen. More specifically, cobalt hydroxide powder may be subjected to a heat treatment at a temperature in a range of 90 to 130° C. for 10 to 100 hours in the air, for example.

Embodiment 2

Embodiment 2 describes an alkaline storage battery according to the present invention. The alkaline storage battery according to Embodiment 2 includes a case, a positive electrode enclosed in the case, a negative electrode, a separator and an electrolyte. As the positive electrode, the positive electrode of the present invention described in Embodiment 1 is used. As members other than the positive electrode, those generally used for alkaline storage batteries can be used. More specifically, as the negative electrode, a negative electrode containing a hydrogen-absorbing alloy or a negative electrode containing cadmium can be used. As the separator, a polyolefin separator that has been treated to be hydrophilic can be used. As the electrolyte, an alkaline solution containing potassium hydroxide or lithium hydroxide as a main solute and having a specific gravity of approximately 1.3 can be used.

Note here that the alkaline storage battery of the present invention may have any shapes such as a cylindrical shape and a rectangular shape. The alkaline storage battery of the present invention is a nickel metal-hydride storage battery and a nickel-cadmium storage battery, for example.

EXAMPLES

The following is more detailed descriptions on the present invention, referring to examples.

Example 1

Example 1 describes an example where a positive electrode for an alkaline storage battery of the present invention and an alkaline storage battery using the same were produced. Firstly, 100 parts by weight of nickel hydroxide powder (mean particle diameter: 12 μm), 10 parts by weight of cobalt compounds powder were kneaded with water added thereto, so that an active material paste was prepared. In this process, cobalt hydroxide (mean, particle diameter : 1 μm) with a valence of cobalt being 2 and β cobalt oxyhydroxide (mean particle diameter: 1 μm) with a valence of cobalt being 3 were used as the cobalt compounds. Then, a ratio of β cobalt oxyhydroxide to the cobalt compounds was changed in a range of 100 weight % to 0 weight %.

This active material paste was filled in a porous nickel foam (porosity: 95%, surface density: 450 g/m²), and after drying and compressing, it was cut into a prescribed size. Thus, positive electrodes with a theoretical capacity of 1,000 mAh were produced. Hereinafter, positive electrodes with ratios of β cobalt oxyhydroxide to the cobalt compounds being 100 weight % (cobalt hydroxide: 0 weight %), 90 weight %, 80 weight %, 70 weight %, 60 weight %, 50 weight %, 40 weight %, 30 weight %, 20 weight %, 10 weight % and 0 weight % (cobalt hydroxide: 100 weight %) will be referred to as positive electrodes A to K, respectively.

On the other hand, positive electrodes as comparative examples were produced by using a paste containing 100 parts by weight of nickel hydroxide powder, 10 parts by weight of cobalt compounds and water. In this process, as the cobalt compounds, 50 weight % of β cobalt oxyhydroxide and 50 weight % of cobalt hydroxide were used. Then, for a positive electrode as comparative example 1, an active material paste was produced by using cobalt hydroxide powder and nickel hydroxide powder coated with cobalt oxyhydroxide, and the positive electrode was produced by using the active material paste. For a positive electrode as comparative example 2, an active material paste was produced by using cobalt hydroxide powder and nickel hydroxide powder coated with cobalt oxyhydroxide, and the positive electrode was produced by using the active material paste. For a positive electrode as comparative example 3, an active material paste was produced by using nickel hydroxide powder and cobalt oxyhydroxide powder coated with cobalt hydroxide, and the positive electrode was produced by using the active material paste.

Next, AA-sized nickel metal-hydride storage batteries were produced using the thus produced positive electrodes. A partially exposed perspective view of one of the thus produced nickel metal-hydride storage batteries is shown in FIG. 1. A nickel metal-hydride storage battery 10 of Example 1 was provided with a case 11 that serves as a negative electrode terminal, a positive electrode plate 12, a negative electrode plate 13, an electrolyte, a separator 14, and a sealing plate 15 equipped with a safety valve. The positive electrode plate 12, the negative electrode plate 13, the electrolyte, and the separator 14 were enclosed in the case 11. The separator 14 was arranged between the positive electrode plate 12 and the negative electrode plate 13.

As the positive electrode plate 12, one of the positive electrode plates mentioned in the above description was used. As the negative electrode plate 13, a negative electrode plate containing a hydrogen-absorbing alloy (MmNi$_{3.6}$Co$_{0.7}$Mn$_{0.4}$Al, where Mm denotes misch metal) was used. As the separator 14, a sulfonated polypropylene separator was used. As the electrolyte, a potassium hydroxide aqueous solution having a specific gravity of 1.3 in which lithium hydroxide was dissolved to obtain a concentration of 20 grams per liter (g/l) was used. In order to produce the nickel metal-hydride storage battery 10, first of all, the positive electrode plate 12 and the negative electrode plate 13 were opposed to each other with the separator 14 interposed therebetween, which was rolled up and disposed inside the case 11. Thereafter, 2.0 cm$^3$ of the electrolyte was poured in the case 11, and was sealed with the sealing plate 15. In this way, the nickel metal-hydride storage battery 10 was produced. In the following description, the batteries employing the positive electrodes A to K will be referred to as batteries A to K, respectively, and the batteries employing the positive electrodes of the comparative examples 1 to 3 will be referred to as comparative batteries 1 to 3, respectively.

Next, the thus produced batteries were subjected to 10 charge/discharge cycles. The charge/discharge was conducted by, as one cycle, charging the battery with 200 mA (0.2 C) until the SOC (State Of Charge) reached 120%, and then by discharging the battery with 200 mA until the battery voltage reached 1.0 V. Then, the discharge capacity at the 10$^{th}$ cycle was measured so as to calculate the utilization factor of the active material. The utilization factor of the active material was calculated according to the following formula: the utilization factor of the active material (%)=(the discharge capacity at the 10$^{th}$ cycle)×100/(the theoretical capacity of the battery).

Figure 2:
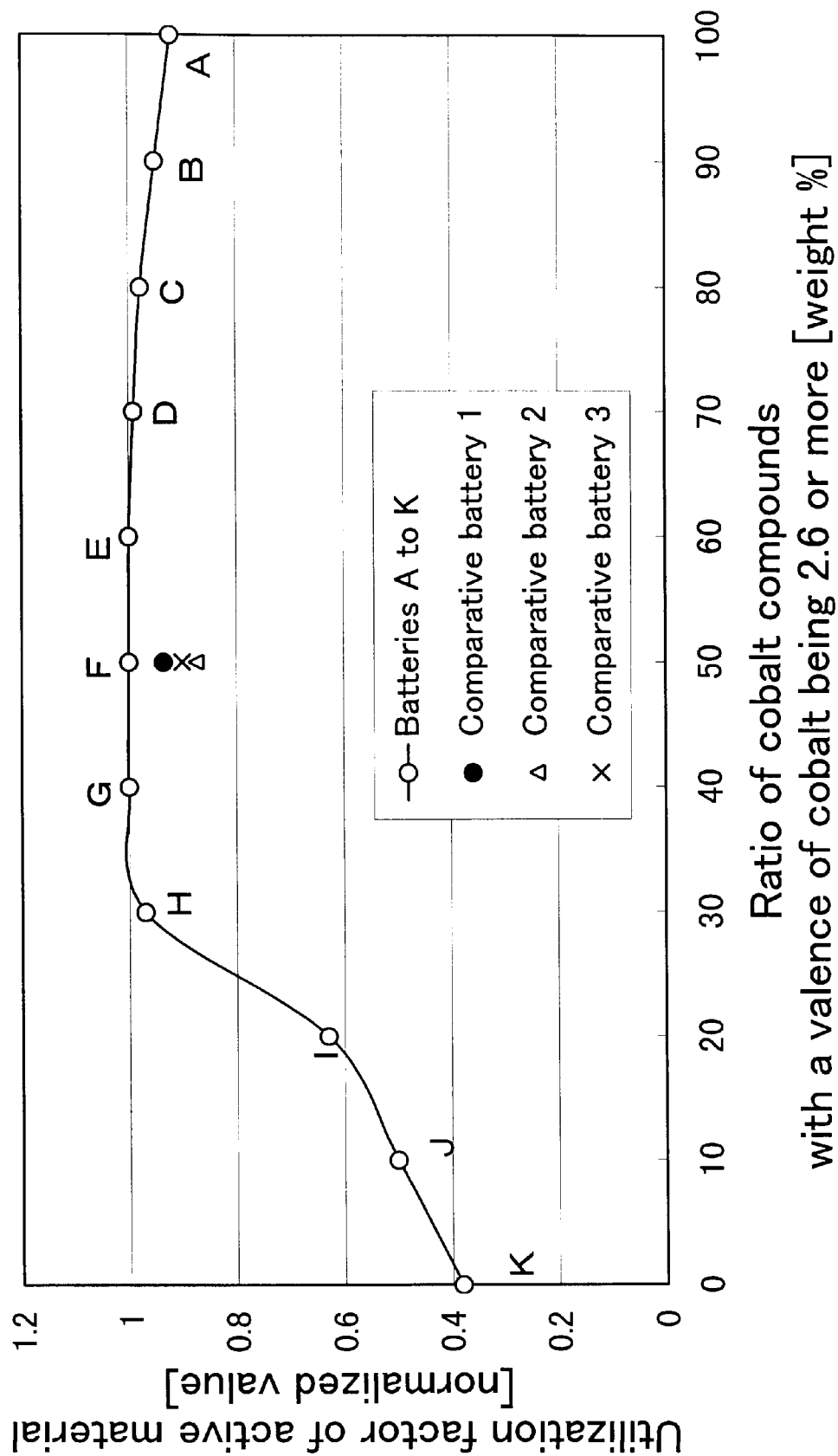
FIG. 2 is a graph showing a relationship between the ratio of the cobalt compound with a valence of cobalt being 2.6 or more to the whole of cobalt compounds and the utilization factor of the active material as to the batteries produced in Example 1.

A relationship between the ratio of the cobalt compound with a valence of cobalt being 2.6 or more to the whole of cobalt compounds and the utilization factor of the active material will be shown in FIG. 2. The vertical axis of FIG. 2 indicates the values of the utilization factors of the active material, which were normalized with setting the utilization factor of the active material in the battery F at 1. The battery F contained 50 weight % of the cobalt compound with a valence of cobalt being 2.6 or more out of the whole of cobalt compounds. As is evident from FIG. 2, the utilization factors of the active material in the batteries A to H, which contained 30 weight % or more of the cobalt compound with a valence of cobalt being 2.6 or more out of the whole of the cobalt compounds, were higher than those in the batteries I to K and the comparative batteries 1 to 3.

Example 2

Figure 3:
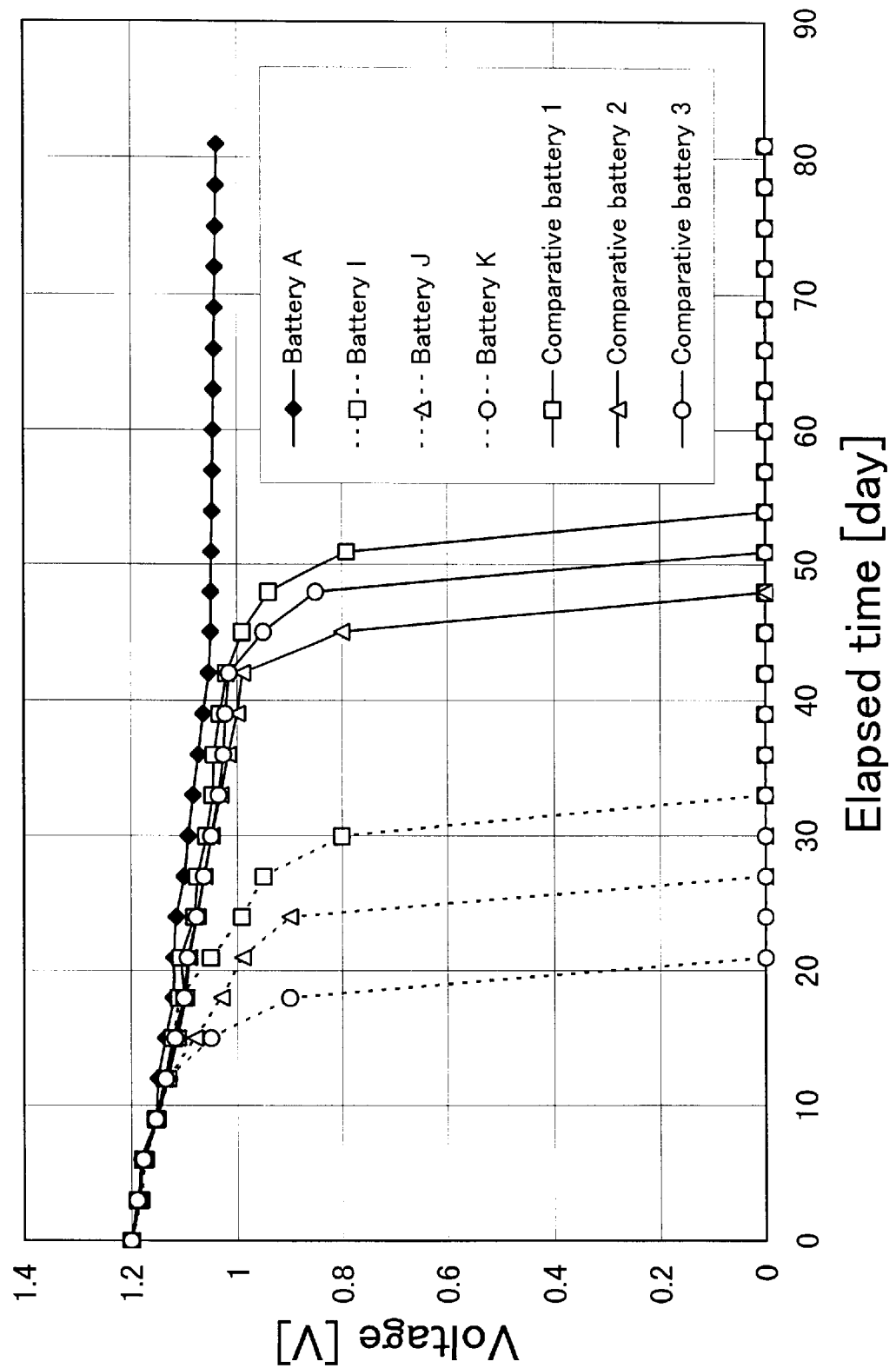
FIG. 3 is a graph showing the retention property of the batteries produced in Example 1.

Example 2 describes an example where the retention properties of the batteries were estimated using the batteries produced in Example 1. More specifically, after discharge, the batteries produced in Example 1 were allowed to stand in an atmosphere at 65° C. where the battery voltages were measured at intervals of 72 hours. FIG. 3 shows the variation in the battery voltages with elapsed time of the batteries A, I, J and K and the comparative batteries 1 to 3. Since the batteries B to H behaved similarly as the battery A, they are not shown in this drawing.

As is evident from FIG. 3, the batteries A to H of the present invention exhibited favorable retention properties. Although the reason for this has not been clarified, it can be considered that by setting the ratio of cobalt oxyhydroxide to the cobalt compounds at 30 weight % or more, the reactivity of cobalt is enhanced, thus decreasing unreacted cobalt hydroxide. On the other hand, as for the batteries I, J and K, it can be considered that unreacted cobalt hydroxide is eluted into the electrolyte and the conductive compounds are precipitated on the surface of the separator, thus decreasing the retention property.

Example 3

Example 3 describes another example where an alkaline storage battery of the present invention was produced.

In Example 3, active material pastes were produced by changing the weight ratio between nickel hydroxide powder and cobalt compounds powder. More specifically, the weight ratio between nickel hydroxide powder and cobalt compounds powder was changed as 100:0, 100:1, 100:2, 100:3, 100:5, 100:10, 100:15, 100:20, 100:25, 100:30 and 100:35 to produce positive electrodes L to V with a theoretical capacity of 1,000 mAh. Note here that the ratio of the cobalt compound with a valence of cobalt being 2.6 or more to the whole of cobalt compounds was set at 50 weight %.

Next, nickel metal-hydride storage batteries were produced using the thus produced positive electrodes in the same manner as in Example 1. Then, each of these batteries was subjected to the charge/discharge cycle test under the same conditions as in Example 1, where the discharge capacity at the 10$^{th}$ cycle was measured.

Figure 4:
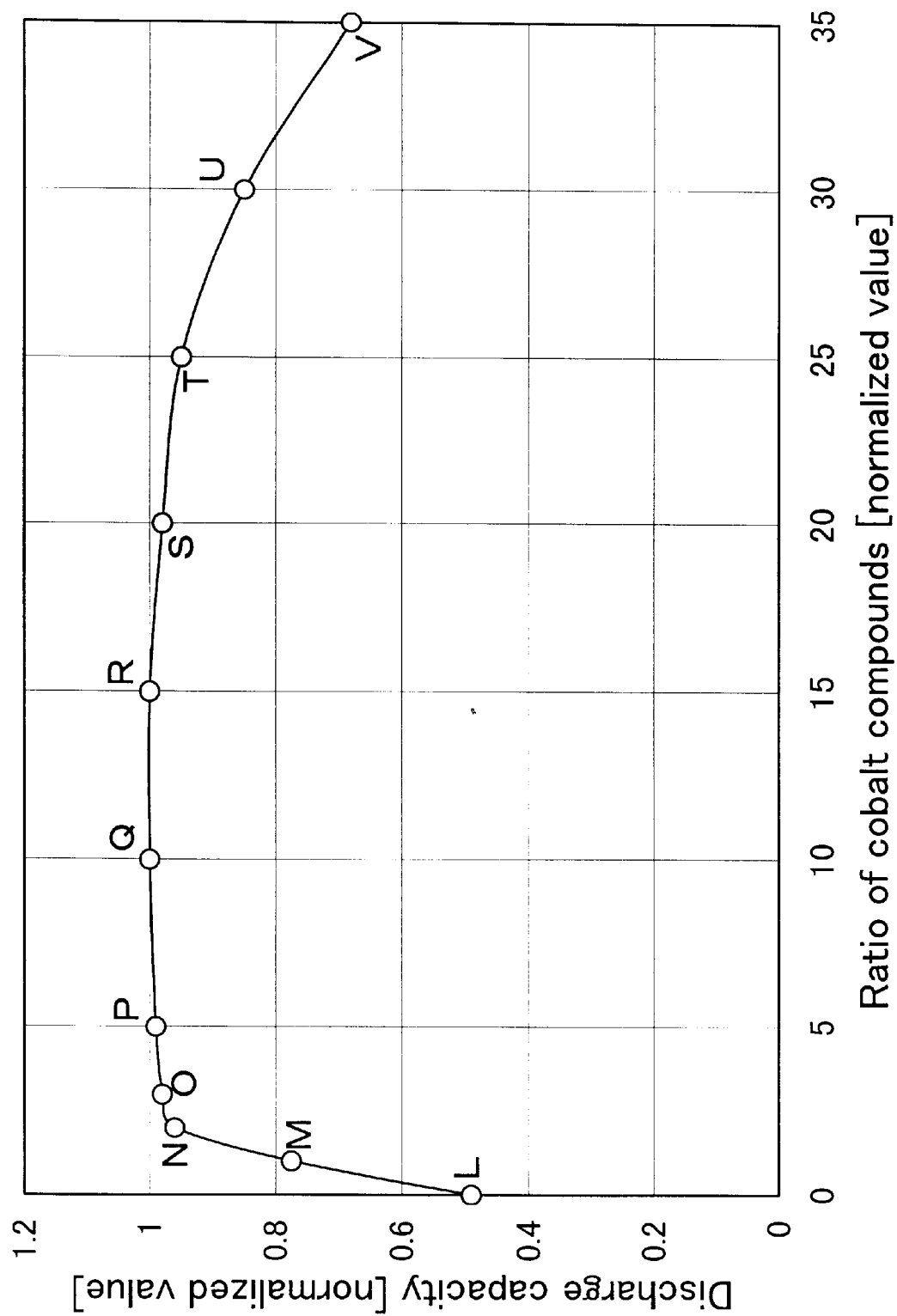
FIG. 4 is a graph showing a relationship between the ratio of the cobalt compounds to the discharge capacity as to the batteries produced in Example 3.

A relationship between the weight ratio of nickel hydroxide powder to cobalt compounds powder and the discharge capacity will be shown in FIG. 4. The horizontal axis of FIG. 4 indicates the weight of cobalt compounds powder, which was normalized with setting the weight of nickel hydroxide powder at 100. The vertical axis of FIG. 4 indicates the values of the discharge capacity, which were normalized with setting the discharge capacity of the battery R at 1. In the battery R, a weight ratio of nickel hydroxide powder to cobalt compounds powder is 100:15. As is evident from FIG. 4, the discharge capacity was high in the batteries whose weight ratio of the active material powder (nickel hydroxide powder) to cobalt compounds powder is in a range of 100:2 to 100:25.

It should be noted that Example 3 deals with the example where the ratio of the cobalt compound with a valence of cobalt being 2.6 or more to the whole of cobalt compounds was 50 weight %. However, also in the case where the ratio of the cobalt compound with a valence of cobalt being 2.6 or more was greater than 50 weight %, the same effects could be obtained insofar as the weight ratio of the active material powder to the cobalt compounds powder was in a range of 100:2 to 100:25.

It should also be noted that although each of the aforementioned examples describes the example where the paste was produced using nickel hydroxide powder and cobalt compounds powder, the same effects could be obtained when a paste was produced by mixing cobalt metal with these powders.

As stated above, according to the present invention, the positive electrode for alkaline storage batteries having a high capacity and facilitating the manufacturing thereof can be obtained. By utilizing this positive electrode, an alkaline storage battery having a high capacity can be produced at a low cost. Also, by utilizing this positive electrode, a high-reliability alkaline storage battery exhibiting a favorable retention property can be produced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A positive electrode for an alkaline storage battery, comprising first powder containing nickel hydroxide and second powder made of cobalt compounds, wherein prior to the second powder being combined with the first powder, a ratio of a cobalt compound with a valence of cobalt being 2.6 or more to a total of the cobalt compounds is 30 weight % or more.

2. The positive electrode for an alkaline storage battery according to claim 1, wherein a weight ratio between the first powder and the second powder is as follows: the first powder : the second powder=100:X, where $2 \leq X \leq 25$.

3. The positive electrode for an alkaline storage battery according to claim 1, wherein the cobalt compound with a valence of cobalt being 2.6 or more is β cobalt oxyhydroxide.

4. The positive electrode for an alkaline storage battery according to claim 1, wherein the first powder includes nickel hydroxide containing at least one element selected from cobalt, zinc, cadmium, magnesium, yttrium, ytterbium and erbium in a solid solution state.

5. The positive electrode for an alkaline storage battery according to claim 1, wherein the cobalt compounds contain at least one element selected from cobalt, zinc, cadmium, magnesium, yttrium, ytterbium and erbium in a solid solution state.

6. An alkaline storage battery comprising a positive electrode, a negative electrode, a separator and an electrolyte, wherein the positive electrode is the positive electrode according to claim 1.

* * * * *